March 19, 1940. J. J. RUSSEL 2,194,247

PISTON

Filed Feb. 6, 1939 2 Sheets-Sheet 1

INVENTOR
J. J. RUSSEL
PER George Hughes
ATTORNEY

March 19, 1940.    J. J. RUSSEL    2,194,247

PISTON

Filed Feb. 6, 1939    2 Sheets-Sheet 2

INVENTOR
J. J. RUSSEL
PER
George Hughes
ATTORNEY

Patented Mar. 19, 1940

2,194,247

UNITED STATES PATENT OFFICE 2,194,247

PISTON

John James Russel, Aylesbury, England

Application February 6, 1939, Serial No. 254,873
In Great Britain December 29, 1937

19 Claims. (Cl. 309—12)

My present invention relates to pistons of the open-ended skirt type and has for its object to obviate piston slap and tilt in the bore, and generally to improve the fit and wear of the piston. The invention is particularly useful in connection with internal combustion engines, but it may be applied to other types of engines making use of a reciprocating piston of the open-ended skirt type.

My present invention is broadly characterised in that the skirt of the piston is provided with means automatically applying and expanding action thereto contemporaneously with the axial or substantial axial thrust on the piston at its connection to the connecting rod or piston rod, during operation of the engine pump or the like.

In carrying the preferred form of my invention into practice the cylindrical wall, or skirt, of a piston is provided with a pair of separate and diametrically opposed supports for a gudgeon pin, said supports and the piston being formed with co-operating wedge or cam-like parts, and the skirt or cylindrical wall being split, the arrangement being that the co-operating wedge or cam-like parts apply an expanding action to the piston consequent upon the opposed axial pressure of the piston and gudgeon pin.

In the preferred form of my present invention the crown is separated circumferentially from the skirt and is joined to the skirt of the piston internally by means affording a resilient couple between the crown and skirt, so that the expansion action of the skirt of the piston against the wall of the cylinder of the engine or compressor or pump shall not interfere with the crown of the piston and all or some of the piston rings, and therefore the present invention broadly consists in the provision of means affording relative adjustment of the crown and skirt of the piston.

In order that this invention may be clearly understood and readily carried into effect drawings are appended hereto illustrating embodiments thereof as applied to internal combustion engines, compressors or pumps and the like, and wherein.

Figure 1:
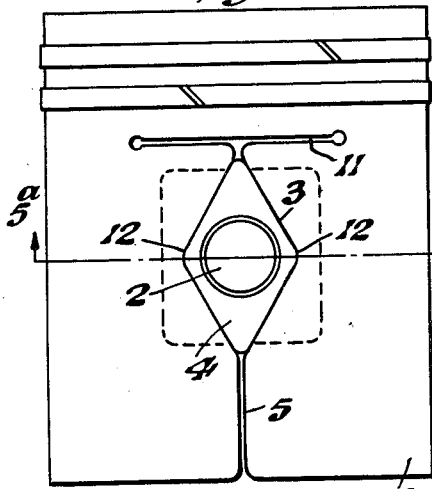
Fig. 1 is an elevation view of one form viewed along the axis of the gudgeon pin.
Figure 2:
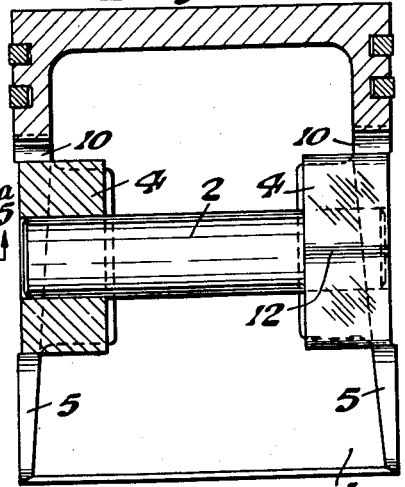
Fig. 2 is a sectional side elevation view of Fig. 1.
Figure 3:
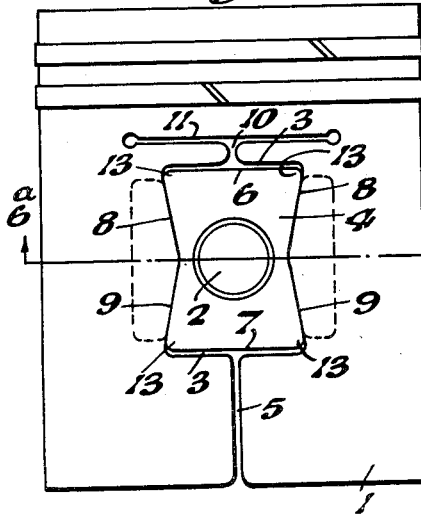
Figs. 3 and 4 are like views respectively of a modification.
Figure 4:
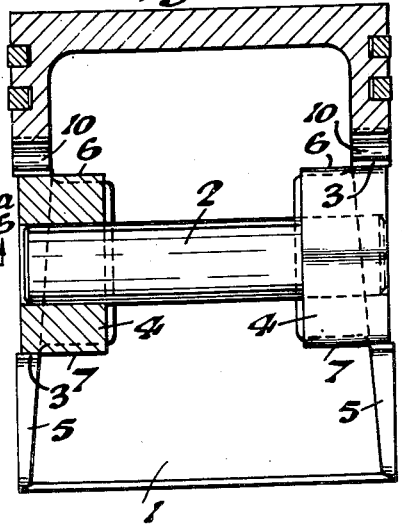
Figure 5:
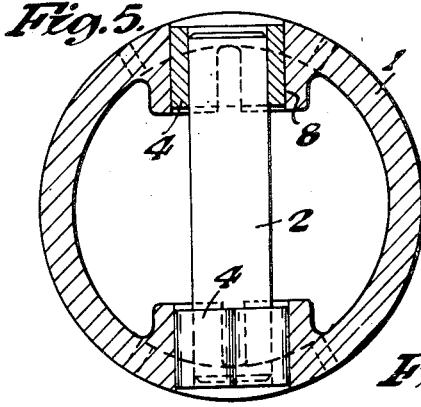
Fig. 5 is a section on the line 5a—5a of Fig. 1.
Figure 6:
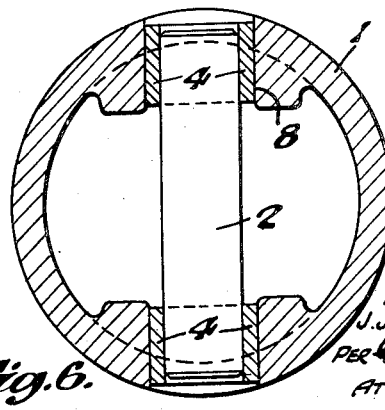
Fig. 6 is a section on the line 6a—6a of Fig. 3.
Figure 7:
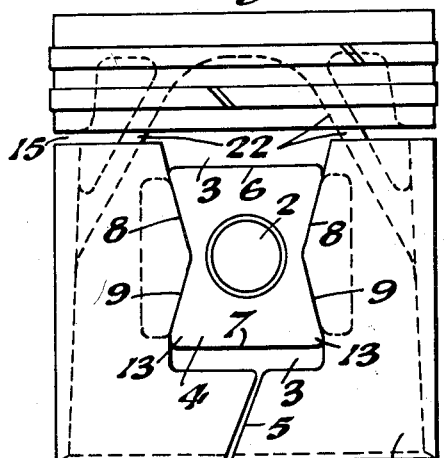
Fig. 7 is an elevation view of another modification showing a continuous circumferential split in the skirt of the piston near the piston head.
Figure 8:
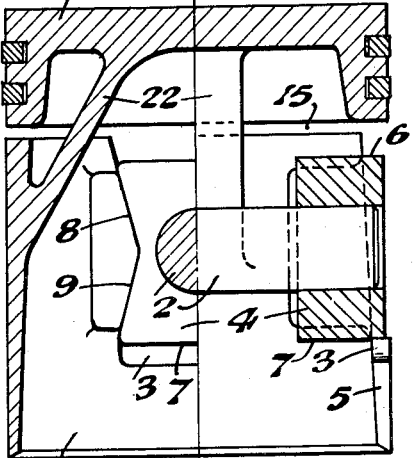
Fig. 8 is a composite sectional elevation showing at the left hand side a section viewed as in Fig. 7, and at the right hand side a sectional side elevation of Fig. 7.

Referring to the drawings on Figs. 1 to 6 inclusive which show a piston having an open-ended skirt 1 supporting a gudgeon pin 2, such skirt is formed at diametrically opposed points with a pair of holes 3 supporting a pair of correspondingly shaped blocks 4 in which are fitted the ends of the gudgeon pin 2, and the skirt is split as at 5 at diametrically opposite points substantially parallel with its axis from such holes to the free edge of the skirt. The said blocks 4 have cam-like relationship to the skirt, and as shown in Figs. 1 and 2 they may be quadrilateral, e. g. diamond shape, so that the axial thrust at the gudgeon pin will tend to expand the skirt, such expansion being facilitated by the splits in the skirt. Instead of a diamond (quadrilateral) shape, the said blocks (and the holes 3 containing them) can be of other suitable shape, e. g. as shown in Figs. 3 and 4 each block may have upper and lower parallel faces 6 and 7 at right angles to the axis of the piston, and each lateral face composed of two symmetrical converging edges 8 and 9 which meet at a plane transverse of the axis of the cylinder and containing the axis of the gudgeon pin, and parallel with the said upper and lower edges. However, the meeting points of the edges 8 and 9 may be above or below the said axis.

It is preferred to split the skirt upwards beyond the uppermost parts of the said two holes 3 as at 10 in Fig. 3, for a short distance and to join the upper end of each said split 10 with the centre of a circumferentially disposed split 11, so that the skirt can be regarded as having at opposed sides two T shaped splits, the vertical limb (constituted by splits 5 and 10) of each of which contains a hole 3 to receive the appropriate wedge member carrying one end of the gudgeon pin.

When using the quadrilateral diamond shaped blocks the corners of each block between the upper and lower corners are preferably radiused as at 12 (see Fig. 1) and also it is preferred to radius the corners 13 of the block 3 as shown in Fig. 3, the holes 3 in both forms being correspondingly shaped.

It is preferable to separate the crown of the piston circumferentially from the predominating portion of the skirt by a continuous circumferential split 15 as shown in Figs. 7 to 12 inclusive, so that the expansion action of the skirt of the piston against the wall of the cylinder shall not be impeded by the upper ring carrying part of the piston, which of course, is preferably not split.

Figure 9:
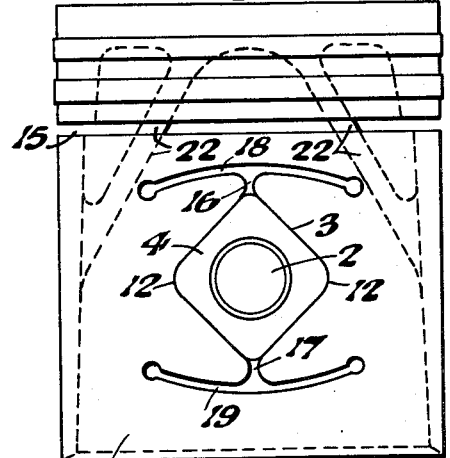
Fig. 9 is a view similar to Fig. 7 of a further embodiment.
Figure 10:
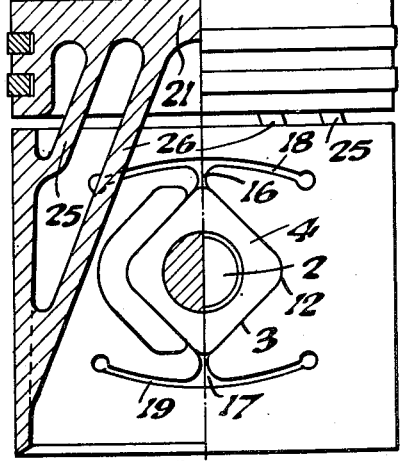
Fig. 10 shows half in sectional and half in outside elevation of a still further modification.

In the embodiments described with reference to Figs. 1 to 6, the skirt is split upwards from its lowest edge, (i. e. the edge remote from the crown) but as shown in Figs. 9 and 10 it is possible and also most probably desirable to eliminate this extension of the split which opens at the lowest edge of the piston for certain sizes and types of pistons, and consequently the skirt can, as shown in Figs. 9 and 10, be split a short distance above and below each hole 3, as at 16 and 17, and to terminate these splits at transverse splits preferably of arcuate configuration as shown at 18 and 19 respectively, so that the piston has at diametrically opposite points two symmetrical substantially T shaped splits, the vertical limb (16 or 17) of each T being shorter than the transverse limb (18 or 19).

Further to the foregoing I have found it desirable to afford greater yield or resiliency between the crown and the skirt in order to obtain the maximum benefit of the wedging or cam action of the blocks and also to increase the life of the piston and to allow the piston to adapt itself more readily to variations in bore and temperature, and therefore the present described embodiments of this invention also include, as above indicated, separating the crown 21 of the piston from the skirt 1 by the endless circumferential slot 15 and the interior of the crown is joined to the interior of the skirt by a suitable arrangement of webs or arms preferably on the high and low thrust sides of the piston. In the arrangements shown in Figs. 7, 8, 9 and 11 the interior of the top of the crown has joined to it a pair of webs or arms 22 which diverge downwardly inverted V fashion and merge at their lower ends into the interior of the skirt either near the lower or top end of the skirt or midway, the arms preferably being radiused or flared as shown where they join the crown and the skirt to obtain strength but having such dimensions that they afford a certain amount of resiliency so that the skirt can be expanded relatively to the crown without throwing excessive strain on the crown or distorting or straining unduly the cylindrical wall part of the whole piston. Alternatively as shown in Fig. 12, these webs can be a pair of webs 23 parallel or nearly parallel with the axis of the piston and cranked as at 24 towards the skirt.

The circumferential slot can be bridged by a ring 20 sprung into a groove the lands of which are on opposite sides of the slot. This will serve as a means for controlling the expanding action of the skirt. Advantage can be taken of this ring to act as an oil scraper. The peripheral part of the crown is sufficiently deep to contain all the necessary rings so that the crown of the piston and ring landings are entirely separated from the skirt excepting of course the connection effected by the said internal arms. More than one pair of internal webs or arms can be provided arranged in any desired manner, e. g. as shown in Fig. 10 a short pair 25 joined at their upper ends to the crown near its periphery and at their lower ends to the skirt just beneath the slot, and a longer pair 26 joined nearer to the centre of the crown and to the lower end of the skirt. Alternatively a number of connecting arms can be arranged at a number of diametrically opposed points, e. g. one opposed pair in a plane at right angles to a plane containing another pair.

These webs or arms act as struts and they also conduct heat away from the crown through the piston skirt to the water jacket and have the advantage of being exposed to a large cooling area whilst affording a short path for the transfer of heat to the jacket.

Figure 11:
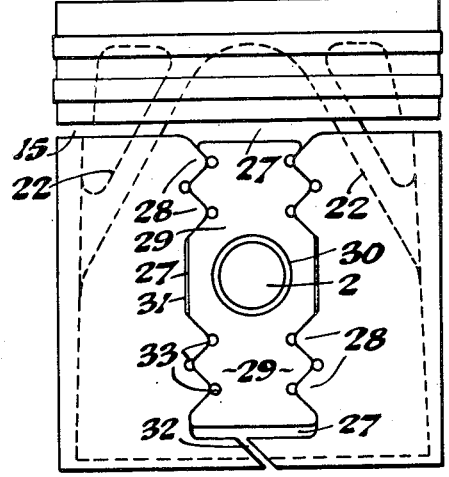
Figs. 11 and 12 are elevation views viewed along the axis of the gudgeon pin of two further embodiments.
Figure 12:
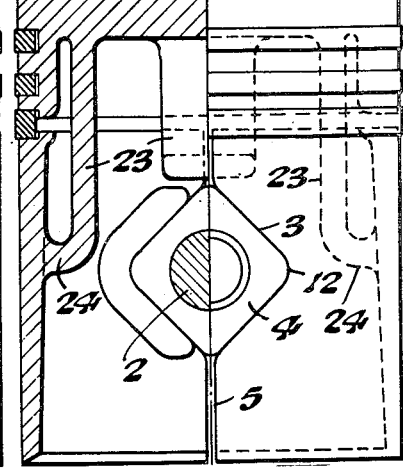

Instead of adopting quadrilateral or like shaped cam blocks 4, the skirt 1 can be split from its lower end to the said circumferential slot 15 or for only a part of the axial dimension of the skirt and each split can, as shown in Fig. 11, be a slot 27 wider than the gudgeon pin and formed at opposed edges with symmetrical V shaped teeth 28, each such slot 27 having fitted therein a correspondingly shaped block 29 formed with the necessary bearings or bosses 30 to receive the gudgeon pin 2. The slots 27 at their points immediately opposite the gudgeon pin ends preferably have edges 31 parallel with the axis of the piston to afford ample material around the gudgeon pin ends, whilst if the block does not extend to the lower edge of the skirt it is preferred to split the lower end of the skirt into the lower end of each slot as at 32 to afford adequate expansion and contraction movements. The apices of the V's of the edges of the slots are preferably formed with small circular holes 33 to prevent splitting.

It is preferred to make the blocks 4 of a composition such as a material of an asbestos base incorporating a binding substance, or certain forms of the material known under the registered trade-mark "Ferodo," a suitable form being known as "Ferobestos," as I find such material is light, highly efficacious and durable, and minimises shocks and conduction of heat.

If desired the piston skirt can be of such cross section as to afford adequate yield to the wedging or cam action of the appropriate blocks with or without the split skirt, and in this connection a possible satisfactory arrangement is the known principle of forming the skirt material quite thin at the opposed parts supporting the gudgeon pin and increasing the thickness beyond such parts, so that the skirt material is at its thickest at opposite parts in the plane at right angles to the gudgeon pin axis. It is found that such a cross-section of skirt affords expansion or yield without necessarily splitting the skirt.

I claim:

1. In a piston of the open-ended skirt type opposed wedge or cam-like supports in diametrically opposed parts of the piston wall and means connecting said supports to the piston rod or connecting rod, said supports applying an expanding action to the piston skirt consequent upon opposed axial thrusts of rod and piston.

2. In a piston of the open-ended skirt type the provision of a pair of diametrically opposed supports for the gudgeon pin, cooperating wedge or cam-like parts with said supports and piston skirt to apply an expanding action to the skirt consequent upon opposed substantially axial pressure of the piston and gudgeon pin, and a split in the skirt to afford the requisite expansion.

3. In a piston of the open-ended skirt type the provision of a pair of diametrically opposed supports for the gudgeon pin, co-operating wedge or cam-like parts with said supports and piston skirt to apply an expanding action to the skirt consequent upon opposed subseantially axial pressure of the piston and gudgeon pin, a split in the skirt to afford the requisite expansion, an endless slot in the piston cylindrical wall separating the head from the skirt, and arms extending across the piston head and skirt.

4. In a piston of the open-ended skirt type the provision of a pair of diametrically opposed supports for the gudgeon pin, co-operating wedge or cam-like parts with said supports and piston skirt to apply an expanding action to the skirt consequent upon opposed substantially axial pressure of the piston and gudgeon pin, a split in the skirt to afford the requisite expansion, an endless slot in the piston cylindrical wall separating the head from the skirt, and arms arranged substantially V fashion extending across the piston head and skirt.

5. In a piston of the open-ended skirt type the provision of a pair of diametrically opposed supports for the gudgeon pin, co-operating wedge or cam-like parts with said supports and piston skirt to apply an expanding action to the skirt consequent upon opposed substantially axial pressure of the piston and gudgeon pin, a split in the skirt to afford the requisite expansion, an endless slot in the piston cylindrical wall separating the head from the skirt, and arms of substantially L configuration extending across the piston head and skirt.

6. A piston comprising a skirt, a head separated circumferentially from the skirt, arms across the interior of the piston connecting the head and skirt, a pair of wedge-like blocks receiving the gudgeon pin ends, and apertures in the skirt receiving said wedge-like blocks and shaped to transmit the working thrust on the blocks to the piston skirt to expand the skirt.

7. A piston comprising a skirt joined to a head, a pair of wedge-like blocks receiving the gudgeon pin ends, and apertures in the skirt receiving said wedge-like blocks and shaped to transmit the working thrust on the blocks to the piston skirt to expand the skirt.

8. A piston comprising a skirt, a head separated circumferentially from the skirt, arms across the interior of the piston connecting the head and skirt, a pair of wedge-like blocks receiving the gudgeon pin ends, apertures in the skirt receiving said wedge-like blocks and shaped to transmit the working thrust on the blocks to the piston skirt to expand the skirt, and a slot splitting the skirt from one of said apertures to one end of the skirt.

9. A piston comprising a skirt, a head separated circumferentially from the skirt arms across the interior of the piston connecting the head and skirt, a pair of wedge-like blocks receiving the gudgeon pin ends, apertures in the skirt receiving said wedge-like blocks and shaped to transmit the working thrust on the blocks to the piston skirt to expand the skirt, and T shaped slots in the skirt containing in their vertical limbs said apertures and blocks.

10. A piston comprising a skirt, a head separated circumferentially from the skirt, arms across the interior of the piston connecting the head and skirt, a pair of wedge-like blocks receiving the gudgeon pin ends, apertures in the skirt receiving said wedge-like blocks and shaped to transmit the working thrust on the blocks to the piston skirt to expand the skirt, slots in the skirt receiving said blocks and interengaging sinuous edges along the slots and said blocks.

11. A piston comprising a skirt joined to a head, a pair of wedge-like blocks of non-metallic cushioning material receiving the gudgeon pin ends, and apertures in the skirt receiving said wedge-like blocks and shaped to transmit the working thrust on the blocks to the piston skirt to expand the skirt.

12. A piston comprising a skirt, a head separated circumferentially from the skirt, arms across the interior of the piston connecting the head and skirt, a pair of non-metallic wedge-like cushioning and bearing blocks receiving the gudgeon pin ends, apertures in the skirt receiving said wedge-like blocks and shaped to transmit the working thrust on the blocks to the piston skirt to expand the skirt, and a slot splitting the skirt from one of said apertures to one end of the skirt.

13. A piston comprising a skirt, a head separated circumferentially from the skirt, arms across the interior of the piston connecting the head and skirt, a pair of wedge-like blocks of non-metallic material of a cushioning nature receiving the gudgeon pin ends, apertures in the skirt receiving said wedge-like blocks and shaped to transmit the working thrust on the blocks to the piston skirt to expand the skirt, and T shaped slots in the skirt containing in their vertical limbs said apertures and blocks.

14. A piston of the open-ended skirt type having an expandible skirt provided with a pair of diametrically opposed apertures, supports for a gudgeon pin in said apertures, said supports and apertures having co-operating wedge or cam-like faces arranged so that thrust applied to the piston substantially axially, and exerted compressively as between the piston head and a gudgeon pin carried by said supports, exerts an expanding action on said skirt.

15. A piston of the open-ended skirt type having an expandible skirt provided with a pair of diametrically opposed apertures, supports for a gudgeon pin in said apertures, said supports and apertures having co-operating wedge or cam-like faces arranged so that thrust applied to the piston substantially axially in either direction, and exerted as between the piston head and a gudgeon pin carried by said supports, exerts an expanding action on said skirt.

16. A piston of the open-ended skirt type having an expandible skirt provided with a pair of diametrically opposed apertures, supports for a gudgeon pin in said apertures, said supports and apertures having co-operating wedge or cam-like faces arranged so that thrust applied to the piston substantially axially in either direction, and exerted as between the piston head and a gudgeon pin carried by said supports, exerts an expanding action on said skirt, said skirt having two pairs of slits, one slit extending to the skirt end from a point in each of said apertures near said skirt end and one slit extending partly round the skirt near a part of each aperture which is remote from the skirt end and joined to said part by a slot running from about its mid-point.

17. A piston of the open-ended skirt type having an expandible skirt provided with a pair of diametrically opposed apertures, supports for a gudgeon pin in said apertures, said supports and apertures having co-operating wedge or cam-like faces arranged so that thrust applied to the piston substantially axially in either direction, and exerted as between the piston head and a gudgeon pin carried by said supports, exerts an expanding action on said skirt, and having an endless slots separating the head from the skirt, internal webs joining said head to said skirt.

18. A piston of the open-ended skirt type having an expandible skirt provided with a pair of diametrically opposed apertures, supports for a gudgeon pin in said apertures, said supports and apertures having co-operating wedge or cam-like faces arranged so that thrust applied to the piston substantially axially in either direction, and exerted as between the piston head and a gudgeon pin carried by said supports, exerts an expanding action on said skirt, and having an endless slot separating the head from the skirt, internal webs joining said head to said skirt, and having a pair of slits, one slit extending to the skirt end from a point in each of said apertures near said skirt end.

19. A piston of the open-ended skirt type having an expandible skirt provided with a pair of diametrically opposed apertures, supports for a gudgeon pin in said apertures, said supports and apertures having co-operating wedge or cam-like faces arranged so that thrust applied to the piston substantially axially in either direction, and exerted as between the piston head and a gudgeon pin carried by said supports, exerts an expanding action on said skirt, and having an endless slot separating the head from the skirt, internal webs joining said head to said skirt, and having a slit between each of said apertures and the skirt end and a slit between each of said apertures and the head, said slits extending partly round the skirt, and each being joined at about its middle to a slot extending to the aperture with which it is associated.

JOHN JAMES RUSSEL.